(12) United States Patent
Wang

(10) Patent No.: US 12,180,944 B2
(45) Date of Patent: Dec. 31, 2024

(54) CONTROL DEVICE FOR GEARBOX

(71) Applicants: ZF WIND POWER (TIANJIN) CO., LTD., Tianjin (CN); ZF Wind Power Antwerpen N.V., Lommel (BE)

(72) Inventor: Fuliang Wang, Tianjin (CN)

(73) Assignees: ZF WIND POWER (TIANJIN) CO., LTD., Tianjin (CN); ZF WIND POWER ANTWERPEN N.V., Lommel (BE)

( * ) Notice: Subject to any disclaimer, the term of this patent is extended or adjusted under 35 U.S.C. 154(b) by 0 days.

(21) Appl. No.: 18/693,222

(22) PCT Filed: Aug. 29, 2022

(86) PCT No.: PCT/CN2022/115427
§ 371 (c)(1),
(2) Date: Mar. 19, 2024

(87) PCT Pub. No.: WO2023/045705
PCT Pub. Date: Mar. 30, 2023

(65) Prior Publication Data
US 2024/0263619 A1    Aug. 8, 2024

(30) Foreign Application Priority Data

Sep. 23, 2021 (CN) .......................... 202111116950.7

(51) Int. Cl.
*F16H 57/04* (2010.01)
*F03D 80/70* (2016.01)

(52) U.S. Cl.
CPC ....... *F03D 80/707* (2023.08); *F16H 57/0435* (2013.01); *F16H 57/0439* (2013.01)

(58) Field of Classification Search
CPC ............ F16H 57/0434; F16H 57/0439; F16H 57/0435; F03D 80/70
See application file for complete search history.

(56) References Cited

U.S. PATENT DOCUMENTS 1,625,564 A * 4/1927 Pollard .................... F16H 3/50
475/308
4,245,593 A * 1/1981 Stein ...................... F02N 19/02
219/202

(Continued)

FOREIGN PATENT DOCUMENTS

| CN | 202381670 U | 8/2012 |
|---|---|---|
| CN | 111350660 A | 6/2020 |

(Continued)

*Primary Examiner* — Michael A Riegelman
(74) *Attorney, Agent, or Firm* — LEYDIG, VOIT & MAYER, LTD.

(57) ABSTRACT

A control device for a gearbox which includes a mechanical pump and an electric pump, the mechanical pump having a first-stage displacement and a second-stage displacement, and the first-stage displacement being less than the second-stage displacement, the control device including a sensor module for detecting an oil pressure of a lubricating oil of the gearbox and a mechanical pump control module for, when the oil pressure is above an oil pressure threshold, controlling the mechanical pump to operate at the first-stage displacement, and when the oil pressure is below the oil pressure threshold, controlling the mechanical pump to operate at the second-stage displacement.

3 Claims, 2 Drawing Sheets

(56) References Cited

U.S. PATENT DOCUMENTS

| | | | | |
|---|---|---|---|---|
| 4,531,485 A * | 7/1985 | Murther | F01M 1/20 123/198 C |
| 4,556,024 A * | 12/1985 | King | F01M 1/12 123/196 AB |
| 4,967,881 A * | 11/1990 | Meuer | F16N 7/385 184/7.3 |
| 5,306,215 A * | 4/1994 | Mann | F16H 3/54 475/141 |
| 5,310,020 A * | 5/1994 | Martin | F04D 29/063 184/104.1 |
| 5,351,664 A * | 10/1994 | Rotter | F16H 57/0415 123/196 AB |
| 5,682,851 A * | 11/1997 | Breen | F01M 11/0458 123/196 A |
| 5,971,107 A * | 10/1999 | Stitz | F16C 33/583 184/7.4 |
| 5,980,340 A * | 11/1999 | Okamoto | B63H 20/28 440/88 L |
| 6,418,887 B1 * | 7/2002 | Okamoto | F02B 75/20 184/104.3 |
| 6,604,515 B2 * | 8/2003 | Marsh | F01P 7/165 123/41.31 |
| 6,692,402 B2 * | 2/2004 | Nakamori | F16H 61/0025 477/3 |
| 6,941,922 B2 * | 9/2005 | Williams | F01M 5/002 123/196 R |
| 7,041,018 B2 * | 5/2006 | Ochiai | F16H 61/0021 474/18 |
| 7,198,020 B1 * | 4/2007 | Beddick | F01M 11/02 123/196 R |
| 7,395,803 B2 * | 7/2008 | Ledger | B60W 10/08 123/196 R |
| 7,506,724 B2 * | 3/2009 | Delaloye | F01D 25/18 184/6.4 |
| 8,145,384 B2 * | 3/2012 | Murahashi | F16H 57/0434 184/26 |
| 2004/0179962 A1 * | 9/2004 | Hopper | F16H 61/0031 417/426 |
| 2005/0034925 A1 * | 2/2005 | Flamang | F16H 57/0434 184/6.12 |
| 2007/0131193 A1 * | 6/2007 | Takahashi | F01M 1/18 123/196 AB |
| 2008/0188351 A1 * | 8/2008 | Schiele | F16H 57/0434 477/98 |
| 2008/0230317 A1 * | 9/2008 | Jen | F04B 39/0207 184/6.24 |
| 2008/0296121 A1 * | 12/2008 | Miyazaki | F16D 25/123 192/113.3 |
| 2009/0191060 A1 * | 7/2009 | Bagepalli | F03D 80/70 184/6.12 |
| 2009/0232673 A1 * | 9/2009 | Reisch | F16H 57/0434 417/364 |
| 2010/0056315 A1 * | 3/2010 | Scholte-Wassink | F03D 80/50 700/282 |
| 2010/0191417 A1 * | 7/2010 | Murahashi | B60B 11/06 184/26 |
| 2012/0241258 A1 * | 9/2012 | Subramaniam | F16N 7/40 184/6.4 |
| 2013/0011263 A1 * | 1/2013 | Subramaniam | F16N 7/40 184/6.12 |
| 2013/0074628 A1 * | 3/2013 | Uusitalo | F16H 57/0435 74/467 |
| 2024/0263619 A1 * | 8/2024 | Wang | F16H 57/0434 |
| 2024/0263696 A1 * | 8/2024 | Wang | F04B 49/20 |

FOREIGN PATENT DOCUMENTS

| | | |
|---|---|---|
| CN | 215596379 U | 1/2022 |
| JP | 2018003795 A | 1/2018 |
| KR | 20100026866 A | 3/2010 |

* cited by examiner

CONTROL DEVICE FOR GEARBOX

CROSS REFERENCE TO RELATED APPLICATIONS

This application is a U.S. National Phase application under 35 U.S.C. § 371 of International Application No. PCT/CN2022/115427, filed on Aug. 29, 2022, and claims benefit to Chinese Patent Application No. 202111116950.7, filed on Sep. 23, 2021. The International Application was published in Chinese on Mar. 30, 2023 as WO 2023/045705 A1 under PCT Article 21(2).

FIELD

The present invention relates to a control device, and in particular, to a control device for an oil pump of a wind turbine gearbox.

BACKGROUND

A wind turbine gearbox is configured to transmit a torque between a main shaft, which is connected to a wind wheel, and an engine, and generally uses a planetary gear train to achieve speed increasing. In an operation process of the gearbox, it is necessary to lubricate various components of the planetary gear train, in particular, a gear meshing portion and a bearing, to ensure normal operation of the gearbox. In a current wind turbine gearbox system, there is a dual oil pump design with a mechanical pump and an electric pump, where the mechanical pump is powered by the rotation of a wind wheel, while the electric pump is powered entirely by external electricity.

However, in a low lubricating oil temperature situation, the electric pump is not activated or operates at a quite low rotation speed, so that a low flow is provided by the electric pump. Therefore, in this case, the mechanical pump is primarily responsive for circulation of lubricating oil in the gearbox for lubrication. Generally, a displacement of the mechanical pump is designed based on a rated load and a rated speed of the gearbox, and a flow of the mechanical pump is entirely determined by an input speed of the gearbox. However, when the input speed of the gearbox is low, a rotation speed of the mechanical pump is also low, which leads to insufficient oil supply. Further, insufficient oil may result in insufficient lubrication of a part such as a gear and a bearing in the gearbox, so that operation and lifetime of the gearbox may be affected.

If, to overcome this problem, the displacement of the mechanical pump is designed based on the low input rotation speed situation, an excessive flow may occur under a rated operating condition, which may cause a high oil pressure, so that a risk of oil leakage is increased, and energy consumption of the gearbox is increased.

SUMMARY

In an embodiment, the present disclosure provides a control device for a gearbox which comprises a mechanical pump and an electric pump, the mechanical pump having a first-stage displacement and a second-stage displacement, and the first-stage displacement being less than the second-stage displacement, the control device comprising a sensor module for detecting an oil pressure of a lubricating oil of the gearbox and a mechanical pump control module for, when the oil pressure is above an oil pressure threshold, controlling the mechanical pump to operate at the first-stage displacement, and when the oil pressure is below the oil pressure threshold, controlling the mechanical pump to operate at the second-stage displacement.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
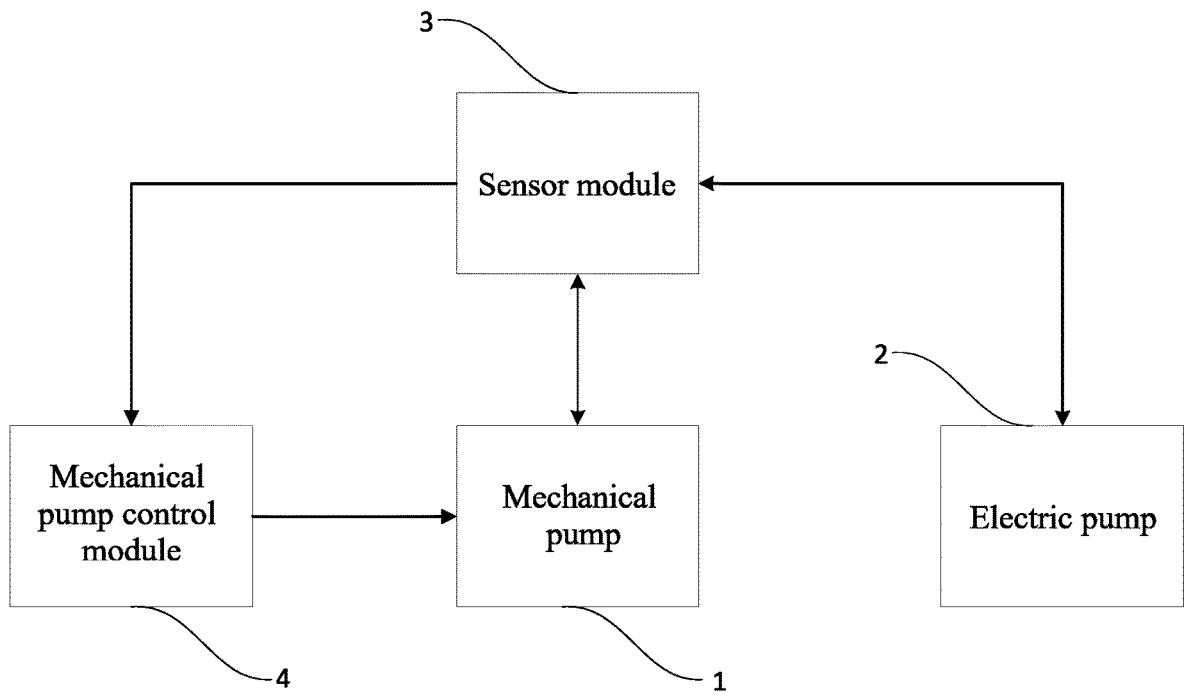
FIG. 1 is a structural block diagram of a control device according to an embodiment of the present invention.

To resolve the defect in the prior art that the use of a mechanical pump with a fixed displacement is difficult to meet different lubrication requirements of a rated operating condition and a special operating condition, a control device for a gearbox is provided, which can adapt to the different lubrication requirements of the rated operating condition and the special operating condition.

In an embodiment, the present invention provides a control device for a gearbox. The gearbox comprises a mechanical pump and an electric pump. The mechanical pump has a first-stage displacement and a second-stage displacement, and the first-stage displacement is less than the second-stage displacement. The control device comprises a sensor module for detecting an oil pressure of a lubricating oil of the gearbox. A low oil pressure generally means that a rotation speed of a wind wheel is low, and a rotation speed of the electric pump is, or is close to, zero, so that a lubrication system relies almost entirely on the mechanical pump, and considering the low input speed of the wind wheel, a rotation speed of the mechanical pump is low.

The control device comprises a mechanical pump control module for, when the oil pressure is above an oil pressure threshold, controlling the mechanical pump to operate at the first-stage displacement, and when the oil pressure is below the oil pressure threshold, controlling the mechanical pump to operate at the second-stage displacement.

In an embodiment, the present invention further provides a control device for a gearbox. The gearbox comprises a mechanical pump and an electric pump. The mechanical pump has a first-stage displacement and a second-stage displacement, and the first-stage displacement is less than the second-stage displacement. The control device comprises a sensor module for detecting an input speed of a wind wheel, and a rotation speed of the electric pump; and a mechanical pump control module for, when the input speed of the wind wheel is greater than or equal to a speed threshold, controlling the mechanical pump to operate at the first-stage displacement, and when the input speed of the wind wheel is less than the speed threshold and the rotation speed of the electric pump is less than a rotation speed threshold, controlling the mechanical pump to operate at the second-stage displacement.

In an embodiment, the present invention further provides a control device for a gearbox. The gearbox comprises a mechanical pump and an electric pump. The mechanical pump has a first-stage displacement and a second-stage displacement, and the first-stage displacement is less than the second-stage displacement. The control device comprises a sensor module for detecting an input speed of a wind wheel, and an oil temperature; and a mechanical pump control module for, when the input speed is greater than or equal to a speed threshold and the oil temperature is above an oil temperature threshold, controlling the mechanical pump to operate at the first-stage displacement, and when the input speed is less than the speed threshold and the oil temperature is below the oil temperature threshold, controlling the mechanical pump to operate at the second-stage displacement.

Preferably, the speed threshold is at least 30% of a rated speed.

Preferably, the speed threshold is at least 50% of the rated speed.

Preferably, the mechanical pump is a two-stage variable displacement pump.

Preferably, the mechanical pump is a continuously variable displacement pump.

The technical effects obtained by embodiments of the present invention are as follows: by using a mechanical pump with two-stage displacement, different displacements are applied in different operating conditions. Therefore, lubrication requirements of a rated operating condition and a special operating condition are both taken into consideration, and insufficient lubrication under low-speed and/or low-temperature conditions, and excessive oil under the rated operating condition are avoided.

Figure 3:
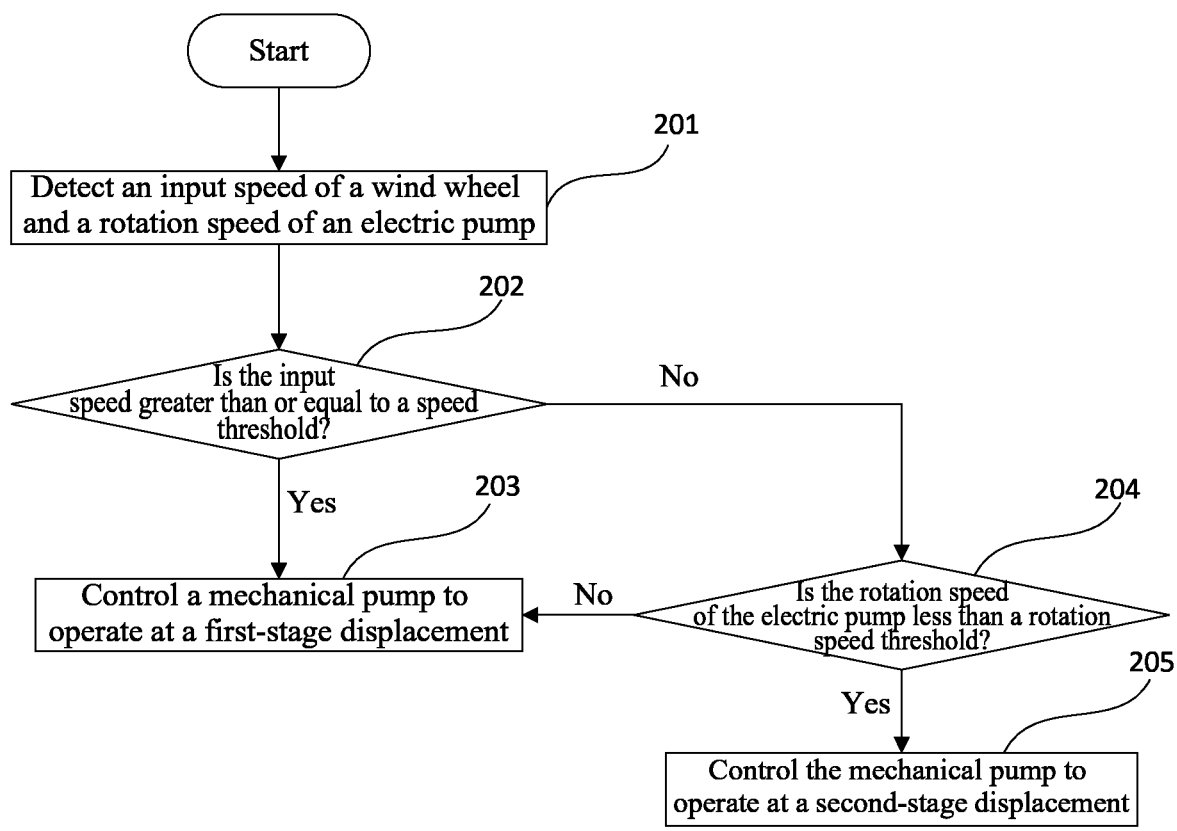
FIG. 3 is a schematic diagram of a control logic of a control device according to an embodiment of the present invention.

Referring to FIGS. 1 and 3, the specific implementations of embodiments of the present invention will be further described below with reference to the accompanying drawings.

Reference is made to FIG. 1, which shows a structural block diagram of a control device for a gearbox. The gearbox comprises a mechanical pump 1 and an electric pump 2. The mechanical pump 1 has a first-stage displacement and a second-stage displacement, and the first-stage displacement is less than the second-stage displacement. The control device comprises: a sensor module 3 for detecting an oil pressure of a lubricating oil of the gearbox; and a mechanical pump control module 4 for, when the oil pressure is above an oil pressure threshold, controlling the mechanical pump 1 to operate at the first-stage displacement, and when the oil pressure is below the oil pressure threshold, controlling the mechanical pump 1 to operate at the second-stage displacement. In this embodiment, the mechanical pump takes the form of a continuously variable displacement pump, and the pressure of the lubricating oil can be stabilized around a certain value.

Figure 2:
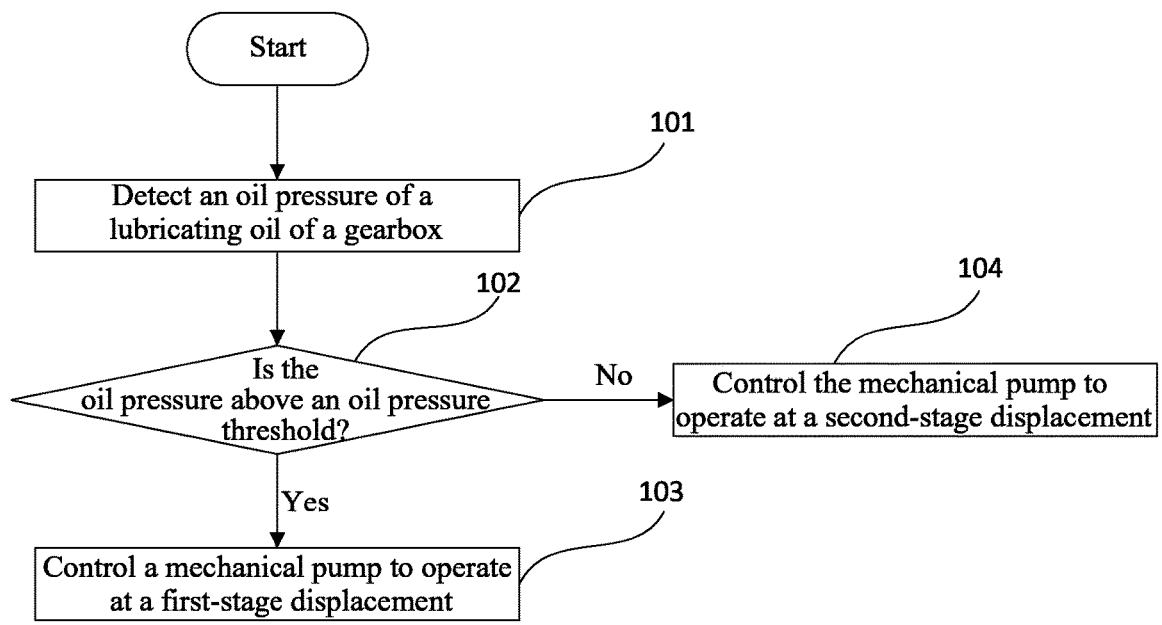
FIG. 2 is a schematic diagram of a control logic of a control device according to an embodiment of the present invention.

Referring to FIG. 2, in this embodiment, a specific control logic of the control device is as follows.

In step 101, the sensor module detects the oil pressure of the lubricating oil of the gearbox. In general, the oil pressure can reflect a current operating state of the gearbox. For example, when an input rotation speed of a wind wheel is low, and the electric pump is not operating, the oil pressure of the lubricating oil may be low, so that the mechanical pump is required to supply the oil at a large displacement.

In step 102, the mechanical pump control module determines whether the oil pressure is above the oil pressure threshold. If yes, it is considered that the gearbox is in a normal operating state and supply of the lubricating oil is sufficient, and the control logic then proceeds to step 103. If no, it is considered that supply of the lubricating oil to the gearbox is insufficient, and the control logic proceeds to step 104.

In step 103, the mechanical pump control module controls the mechanical pump to operate at a small displacement (e.g., the first-stage displacement), thereby avoiding a high oil pressure caused by excessive oil.

In step 104, the mechanical pump control module controls the mechanical pump to operate at a large displacement (e.g., the second-stage displacement), thereby avoiding insufficient lubrication.

Referring to FIGS. 1 and 3, as an alternative to monitoring the oil pressure, in an embodiment, the control device can determine an operating condition of the gearbox by monitoring an input speed of a wind wheel and a rotation speed of the electric pump. Specifically, the sensor module 3 is used for detecting the input speed of the wind wheel, and the rotation speed of the electric pump; and the mechanical pump control module 4 is used for, when the input speed of the wind wheel is greater than or equal to a speed threshold, controlling the mechanical pump 1 to operate at the first-stage displacement, and when the input speed of the wind wheel is less than the speed threshold and the rotation speed of the electric pump 2 is less than a rotation speed threshold, controlling the mechanical pump 1 to operate at the second-stage displacement. In this embodiment, the mechanical pump is a two-stage variable displacement pump.

In an embodiment, a control logic of the control device is as follows.

In step 201, the input speed of the wind wheel and the rotation speed of the electric pump are detected. If the rotation speed of the electric pump is quite low, or even the electric pump is not operating, lubrication can rely entirely on the mechanical pump. Since the operation of the mechanical pump relies on the functioning of the wind wheel, the input speed of the wind wheel is an important indicator for evaluating the operating condition of the mechanical pump.

In step 202, the mechanical pump control module determines whether the input speed is greater than or equal to the speed threshold. If yes, the control logic proceeds to step 203. If no, the control logic proceeds to step 204.

In step 203, the mechanical pump control module controls the mechanical pump to operate at a small displacement (e.g., the first-stage displacement), thereby avoiding a high oil pressure caused by excessive oil.

In step 204, the mechanical pump control module determines whether the rotation speed of the electric pump is less than a rotation speed threshold. If yes, it indicates that the electric pump cannot supply sufficient oil, and the control logic proceeds to step 205. If no, it indicates that the electric pump can basically ensure oil supply of the gearbox, and the control logic proceeds to step 203.

In step 205, the mechanical pump control module controls the mechanical pump to operate at a large displacement (e.g., the second-stage displacement), thereby avoiding insufficient lubrication.

In an embodiment, the gearbox still comprises a mechanical pump and an electric pump. The mechanical pump has a first-stage displacement and a second-stage displacement, and the first-stage displacement is less than the second-stage displacement. The difference is that the control device comprises: a sensor module for detecting an input speed of a wind wheel, and an oil temperature; and a mechanical pump control module for, when the input speed is greater than or equal to a speed threshold (which, for example, is 50% of a rated speed) and the oil temperature is above an oil temperature threshold, controlling the mechanical pump to operate at the first-stage displacement, and when the input speed is less than the speed threshold and the oil temperature is below the oil temperature threshold, controlling the mechanical pump to operate at the second-stage displacement. To monitor the operating condition of the gearbox more precisely, the input speed of the wind wheel, and the oil temperature are detected. Detection of the oil temperature depends primarily on determination of a state of the electric pump. Generally, in a low oil temperature situation, the electric pump is basically not operating, or is operating at an extremely low speed. There is a certain correlation between the input speed of the wind wheel and an input parameter of the mechanical pump. For example, if the input speed of the wind wheel is slow, it means the mechanical pump is required to operate at a large displacement for supply of sufficient lubricating oil.

Although embodiments of the present invention are described above, it should be appreciated by those skilled in the art that these are merely illustrative. Various changes or modifications to these embodiments can be made by those skilled in the art without departing from the principle and spirit of the present invention, and these changes or modifications fall within the scope of the present disclosure.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A control device for a gearbox which comprises a mechanical pump and an electric pump, the mechanical pump having a first-stage displacement and a second-stage displacement, and the first-stage displacement being less than the second-stage displacement, the control device comprising:
    a sensor module for detecting an oil pressure of a lubricating oil of the gearbox; and
    a mechanical pump control module configured to, when the oil pressure is above an oil pressure threshold, control the mechanical pump to operate at the first-stage displacement, and when the oil pressure is below the oil pressure threshold, control the mechanical pump to operate at the second-stage displacement.

2. The control device of claim 1, wherein the mechanical pump is a two-stage variable displacement pump.

3. The control device of claim 1, wherein the mechanical pump is a continuously variable displacement pump.

* * * * *